(12) United States Patent
Goldner et al.

(10) Patent No.: US 6,580,033 B1
(45) Date of Patent: Jun. 17, 2003

(54) TELEMETRY HARNESS FOR TOWED FIBER OPTIC ACOUSTIC ARRAY

(75) Inventors: Eric L. Goldner, Valencia, CA (US); Gary T. Griffin, Millican, TX (US); Clifton B. Bosley, Jr., Annapolis, MD (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/627,550

(22) Filed: Jul. 28, 2000

(51) Int. Cl.⁷ ............................................. H01B 7/00
(52) U.S. Cl. ................................. 174/72 A; 385/12
(58) Field of Search ................. 174/72 A, 68.3, 174/99 R, 70 S, 35 GC, 385, 68.1, 70 R; 385/12, 100, 101, 147

(56) References Cited

U.S. PATENT DOCUMENTS 4,791,236 A * 12/1988 Klein et al. .................. 174/36
5,345,526 A * 9/1994 Blew .......................... 385/112
6,213,995 B1 * 4/2001 Steen et al. .................. 604/527
6,278,823 B1 * 8/2001 Goldner et al. .............. 385/100

FOREIGN PATENT DOCUMENTS

FR                506298 A2 * 9/1992 ................. 385/100

* cited by examiner

Primary Examiner—Dean A. Reichard
Assistant Examiner—Jinhee J. Lee
(74) Attorney, Agent, or Firm—Elliott N. Kramsky

(57) ABSTRACT

A telemetry harness for a hydrophone array which carries and positions the signal carrying elements of the array for ready assembly and reconfiguration. An elongated fabric incorporates bare optical fibers as well as optical and electrical cables and tension-resistant strength members. The fiber is characterized by markings, fiber slackness and apertures at predetermined locations that assist an assembler in determining where to cut selected bare fibers for splicing. The harness is wrapped around a layer of open cell foam that surrounds the aligned and linked sensors of an array segment with the resultant locations of the various sensors in resultant registration with the appropriate overlying fibers of the harness.

20 Claims, 3 Drawing Sheets

TELEMETRY HARNESS FOR TOWED FIBER OPTIC ACOUSTIC ARRAY

BACKGROUND

1. Field of the Invention

The present invention relates to towed fiber optic acoustic arrays. More particularly, this invention pertains to a harness for containing and directing the various conductors associated with a towed array for measuring acoustic signals.

2. Description of the Prior Art

Hydrophones of fiber optic design are advantageously employed, for example, to detect the presence of submerged objects and to conduct underwater seismic studies. Such devices operate upon the interferometer principle with the path of an input beam split between reference and sensing paths. Such paths are created by winding fibers upon physically separate mandrels, one of which is dimensionally-unaffected by and the other of which is affected by pressure variations. See, for example, U.S. Pat. No. 5,317,544 of Maas et al. for "Multiple Segment Fiber Optic Hydrophone." Hydrophones are commonly deployed in geometrical arrays for generating a plurality of spatially-distributed data points. Such distributed data may be analyzed to enhance reliability via averaging techniques, to determine direction of travel and to generate object profiles or "shadows."

A conventional hydrophone array or the above-described type is illustrated schematically in FIG. 1. As shown, an input pulse 10 is launched through a fiber optic transmission line from a gated laser source 12 toward a series of separate fiber optic interferometer sensors configured, for example, as hydrophones 14 arranged in parallel between an input transmission line 16 and a return line 18. With suitable delays in the fiber optic network, the single input light pulse is divided up among the interferometer sensing elements. The pulse 10 is split in the case of each hydrophone interferometer between a reference path (indicated "A") and a sensing path (indicated "B"). An output light pulse with appropriate pulse amplitude-modulated acoustic information encoded thereon is associated with each sensing element. The output light pulses are coupled sequentially onto a return fiber optic transmission line that communicates with a photodiode receiver 20 and associated signal processing electronics 22. Thus, one input light pulse 10 is converted into a train of light pulses 24 equal to the number of sensors.

The time duration of the output pulse train 26 governs the repetition rate of the input pulse 10. After one output pulse train is received, it is closely followed by another derived from a second input pulse. The duty cycle of the input pulse train is low. (It can equal 1/N where N is the number of sensors interrogated without overlapping of adjacent output pulses.)

The complete assembly of a linear towed array requires the integration of numerous elements into a "package" suitable for the intended environment and use. Such assembly must necessarily incorporate an often quite large plurality of hydrophones, associated optical (e.g., couplers, splices, delay lines, etc.) and electronic (e.g., amplifiers, multiplexers, etc.) elements as well as conductors, both optical and electrical, for facilitating the necessary communication of signals between such devices and (often very) remote ship-based apparatus such as a laser source, photodetector, multiplexer and other signal processing devices. The assembly may be somewhat simplified by the use of modular assemblies that package a number of elements, often similar in size to the hydrophones themselves. An example of such a modular arrangement is taught in pending U.S. patent application Ser. No. 09/362,768 of Goldner et al. titled "Fiber Optic Component Assembly System."

The selective interconnection of optical and electronic elements required to form a complete fiber optic towed array system necessarily demands the further packaging of numerous electrical and optical cables and fibers and the coupling thereof to a predetermined system element. The complete assembly of such an extensive system is a daunting task. Additionally, the various signal conductors are individually relatively fragile and therefore vulnerable and require that packaging arrangements take into account the significant stresses that can be exerted by the deployment of an underwater array that may attain a mile or more in length.

Prior art apparatus for delivering optical and electrical conductors to the devices that comprise a hydrophone array have relied upon standard cabled fiber, often bundled with copper cabling. The use of such arrangements results in relatively high cost of next-level assembly. That is, such arrangements require the stripping of outer and inner plastic (and other) sheathing materials, as well as complicating identification of individual fibers within an often large cabled set.

SUMMARY OF THE INVENTION

The preceding and other shortcomings of the prior art are addressed by the present invention that provides a telemetry harness for supporting a plurality of conductors for conductive interconnection with aligned sensors and modules of a segment of a towed array. Such harness includes an elongated flexible member of woven fabric. A plurality of optical fibers is fixed to and arranged generally longitudinally with respect to the fabric.

The foregoing and additional features and advantages of the present invention will become further apparent from the detailed description that follows. Such description is accompanied by a set of drawing figures. Numerals of the drawing figures correspond to those of the written description with like numerals referring to like features throughout.

DETAILED DESCRIPTION OF THE PREFERRED EMBODIMENT

Figure 1:
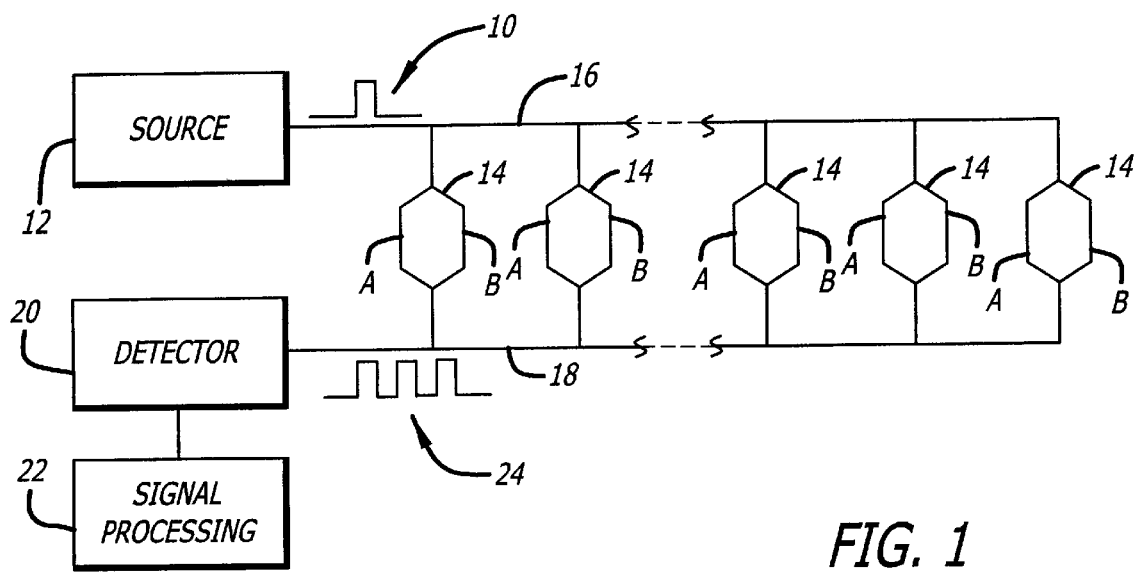
FIG. 1 is a schematic view of a representative fiber optic hydrophone array for utilizing a harness in accordance with the invention.
Figure 2A:
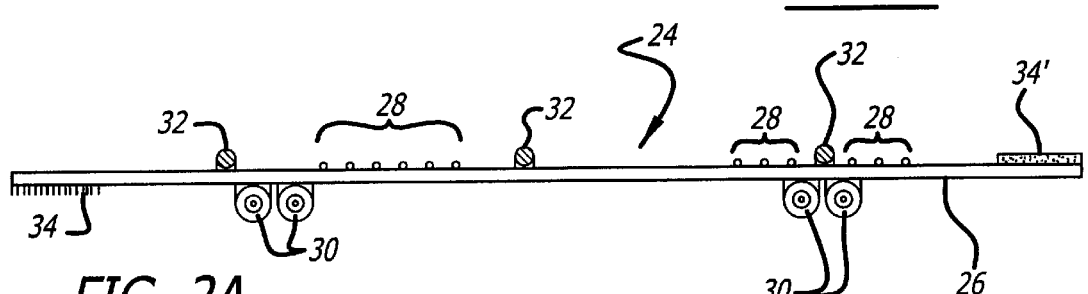
FIGS. 2(a) and 2(b) are frontal edge and cross-sectional views, respectively, of a telemetry harness in accordance with the invention, the latter view showing the harness incorporated into a segment of a hydrophone array.
Figure 2B:
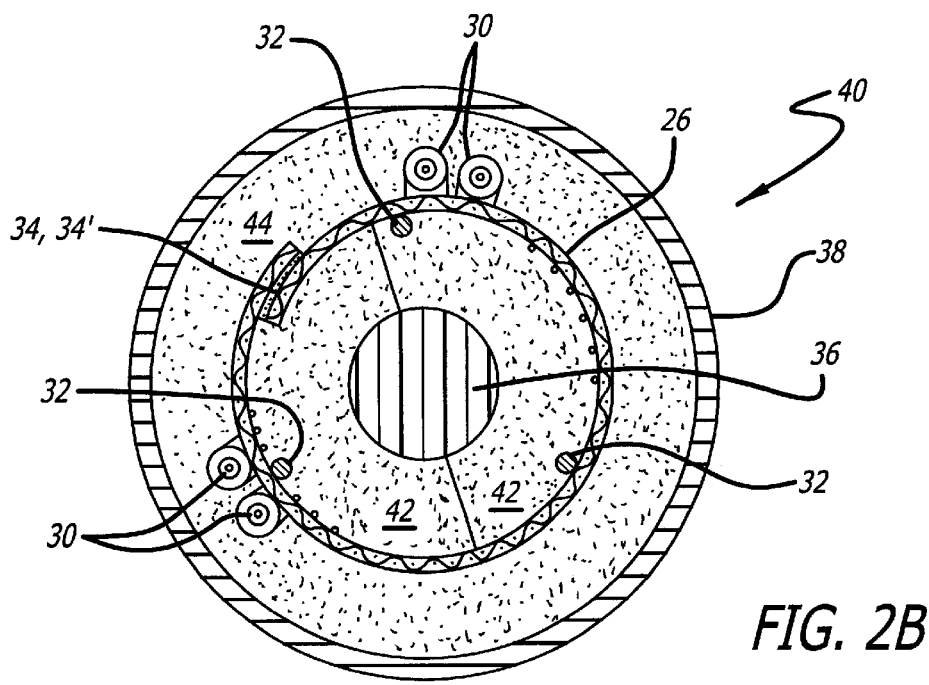

Turning now to the drawings, FIGS. 2(a) and 2(b) are frontal edge and cross-sectional views, respectively, of a telemetry harness in accordance with the invention, the latter view showing the harness incorporated into a segment of a hydrophone array. Referring to the two views, in combination, the harness 24, which facilitates the "wiring"

of the sensor array, is of flexible character comprising an assemblage of elements that are integrated into a common matrix of fabric 26, that, as will be seen in succeeding figures, is of elongated shape. The harness 24 is preferably loom-formed with the various elements thereof, including single, coated optical fibers 28, optical and electrical cables 30 and strength members 32 integrated as the fabric 26 is woven. The closed shape of the elongated fabric matrix 34 is secured by mating strips 34, 34' of VELCRO or like hook and loop closure material that are fixed along opposed longitudinal edges to provide a secure and reversible method for securing the harness into a closed cylindrical configuration as shown in FIG. 2(b). This enables an assembler to correct, overhaul and reconfigure interconnections between the conductors of the harness 24 and the various internally-located sensors and modular elements of the array segments and is contrasted with the tedious and complex processes required to reconfigure or rewire a hydrophone array in accordance with the prior art.

The harness 24 supports a conductor infrastructure that permits signal communication (both electrical and optical) between on-shore and/or shipboard signal sources and detectors and the array sensors. (Note: An array segment may include sensors other than hydrophones, such as temperature, orientation and d.c. pressure sensors that generate either electrical or optical signal outputs.) The spaced, longitudinally-directed strength members 32 which provide tensile stress relief are preferably formed of steel rope, a braided synthetic polymer such as that marketed under the trademark VECTRAN (a multifilament yarn spun from the liquid crystal polymer marketed by the Celanese Corporation under the trademark VECTRA) or a braided aramid such as that marketed by DuPont Corporation under the trademark KEVLAR (aramid fibers made from polyparaphenylene teraphthalamide). As mentioned above, the strength members 32, just as the cables 30 and the bare intra fibers 28 are woven into (or captured occasionally by weft yarns of) the fabric 26 as the harness is formed.

Signal communication elements incorporated into the harness 24 include the plurality of individual, coated optical fibers 28 that may be woven into either the inside, outside or both surfaces of the fabric 26 and the through-cables 30 that may carry either optical or electrical conductors (i.e. fiber or wire) or a combination of both. (Note: Referring to FIG. 2(b), the inside surface of the fabric 26 faces the modules and sensors (shown collectively as 36) that lie along the axis of the array, while the outside surface of the harness faces the hose wall 38 that provides an outer cover for the array.)

Through cables carry electrical wires and optical fibers that are not to make connection with any sensor elements of a particular array segment but need to traverse the segment to provide signal path continuity. Continuity is preserved at the ends of array segments by terminating the individual optical fibers in ferrules and the electrical conductors in pins at end couplings that are then received at optical connectors that, in turn, properly maintain signal paths by connecting contacting appropriate ferrules and electrical pins from segment to segment.

Referring in particular to FIG. 2(b), a sensor or modular element 36 that may comprise, for example, a mandrel of the type disclosed in U.S. Pat. No. 5,317,544 of Maas et al. entitled "Multiple Segment Fiber Optic Hydrophone" or an associated telemetry module (such as that described in pending U.S. patent application Ser. No. 09/362,786.) The element 36 is centrally positioned within a segment 40 of the hydrophone array. Sensor and modular elements 36 of an array segment may be joined to one another along the length of an array segment by means of elongated flexible members such as that taught by U.S. Pat. No. 5,748,565 of Cherbettchian et al. entitled "Flexible Interlink For Hydrophone Array". It shall be seen below that the weave of the fabric 26 incorporates the bare intra-segment optical fibers in a number of ways that assure appropriate registration of overlying infrastructure work areas (e.g. for making splices) with internal sensors and modular elements to thereby facilitate and simplify the work of an assembler.

A towed array comprises a plurality of adjoined segments 40. Each segment 40 is terminated at its opposed ends by a coupling (not shown). Such a coupling receives the terminal ends of all optical fibers and electrical conductors that traverse the particular segment of the array. Each terminal end of an optical fiber (whether it traverses the segment individually or within a cable) is received at a ferrule. Likewise, the ends of electrical cables integrated into the harness 24 are received and terminated in contact pins. The opposed ends of strength members 32 are received at appropriate fittings that secure them to the couplings. A ball swage is an example of an appropriate fitting.

The pin and ferrule terminations that protrude through the couplings at facing ends of adjacent array segments are electrically and optically coupled to one another to maintain continuity of electrical and optical connections by means of an appropriate connector such as that taught by U.S. Pat. No. 5,590,220 of Goldman et al., property of the assignee herein, entitled "Multichannel Fiber Optic Connector". The required optical and electrical signal paths are thereby maintained throughout an array that may be miles in length and may consist of dozens of segments. (Note: An array is typically subdivided into aligned interconnected segments, each containing several hydrophone assemblies.)

A layer 42 of open cell foam is interposed between the array segment elements 36 and the telemetry harness 24. An outer layer 44 of open cell foam then surrounds the harness 24. The inner layer 42 provides mechanically necessary separation between the array elements 36 and the surrounding harness 24 while the surrounding log 44 is provided for protection of the enclosed instruments, sensors and conductors. The hose wall 38 seals and protects the segment 40 from handling and from the surrounding environment while the open cell foam of the inner and the surrounding layers 42 and 44 permits the array segment to be flooded by an appropriate fluid to create a neutral buoyancy array. Fluids, such as that marketed under the trademark ISOPAR, are appropriate.

Figure 3:
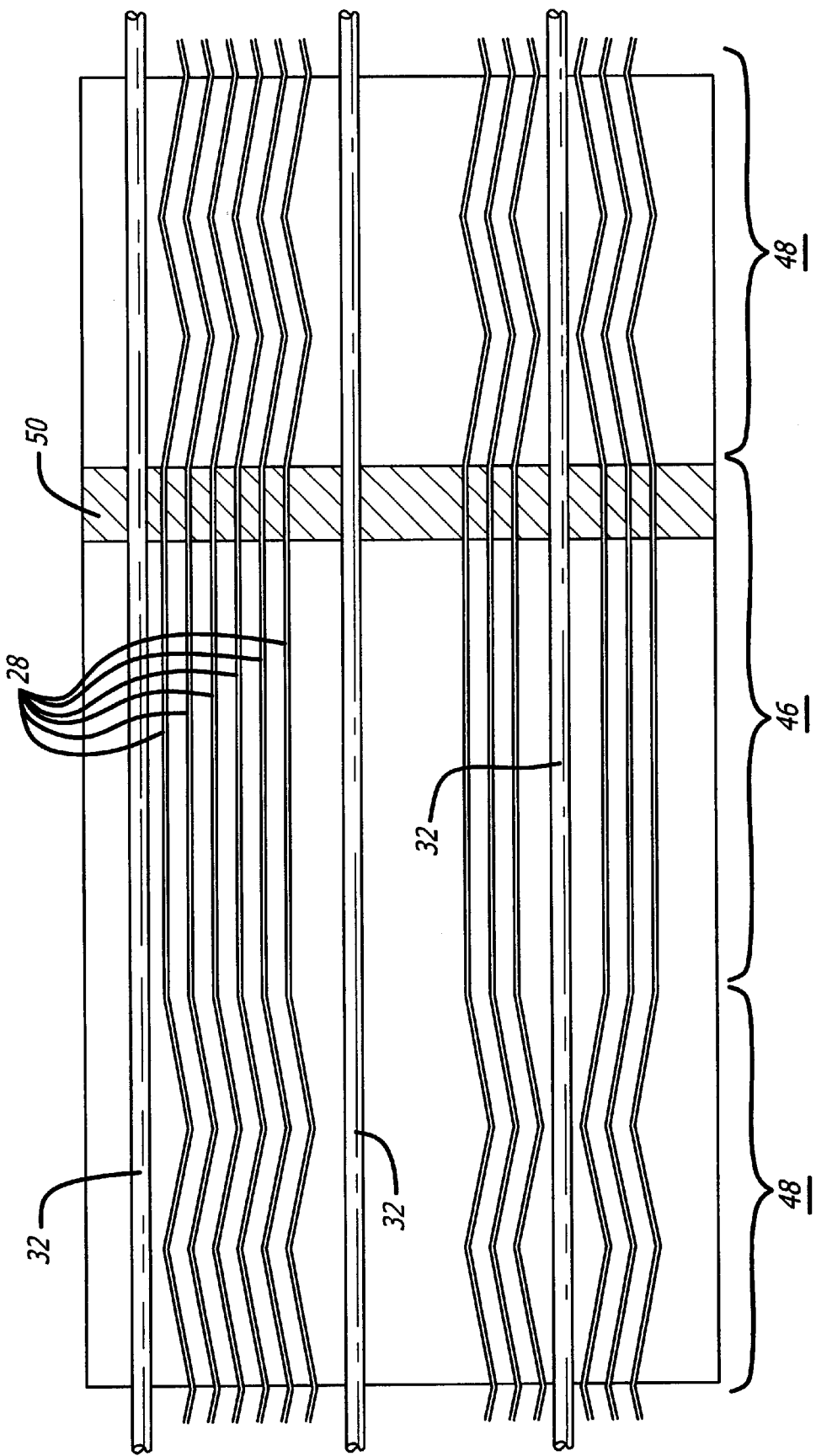
FIG. 3 is a detailed planar view of a portion of the inner surface of a telemetry harness in accordance with the invention.

FIG. 3 is a planar view of the inside surface of the telemetry harness 24 shown in the preceding figures that illustrates the layout of the individual, non-cabled fibers 28. As can be seen, the generally-longitudinally-directed optical fibers 40 are woven into the elongated fabric 26 in patterns that include both straight 46 and sinusoidal 48 portions. The sinusoidal fiber configuration is employed to counter the well-known failure modes of optical fibers subjected to compression or tension. Such forces can be imposed upon the optical fibers as, for example, an array is reeled onto a take-up reel or a ship. By arranging the fibers into a sinusoidal pattern, the fibers experience changes in bend radius rather than pure compression or tension.

The straight sections 46, which, unlike the sinusoidal sections 48, are only fixed to the weave of the elongated fabric 26 at their end points, are located at predetermined portions selected to be in approximate registration with the axially-aligned sensors and telemetry modules enclosed within the harness (see FIG. 2(b). In this way, an assembler is aided in quickly recognizing and cutting the appropriate fiber(s) for splicing to underlying array elements. The assembler is further aided by the presence of longitudinal or transverse strips 50 within the weave or subsequently ink stamped with color(s) that contrast to the remainder of the fabric 26. Such strips 50 provide additional information about the locations of splices for the assembler, further facilitating the assembly and repair processes. (Note: the preceding discussion of strips within the weave for guiding an assembler is by no means intended to be comprehensive as numerous codings might be applied to such striping. For example, multiple strips might be employed to indicate, for example, to distinguish whether the "first" or the "second" fiber should be cut at a particular location.) The present invention, in which all fibers needed for splicing within a segment are separated throughout that segment and others cabled is to be contrasted with the prior art in which all fibers are carried in cables throughout all segments. Such prior art arrangements require that at each hydrophone or telemetry module within each segment, at least one cable be stripped, with fibers broken out, for making required splices, a tedious and substantially more complex task for the assembler than required when employing a harness in accordance with the invention.

Figure 4A:
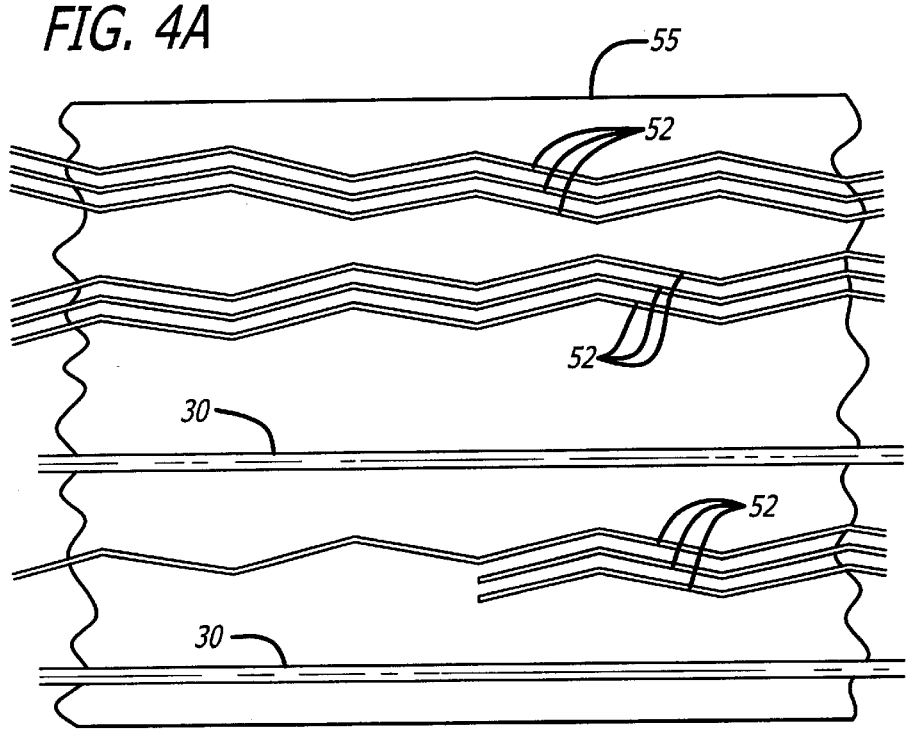
FIGS. 4(a) and 4(b) are detailed planar views of the outer and inner surfaces, respectively, of a telemetry harness in accordance with an alternative embodiment of the invention.
Figure 4B:
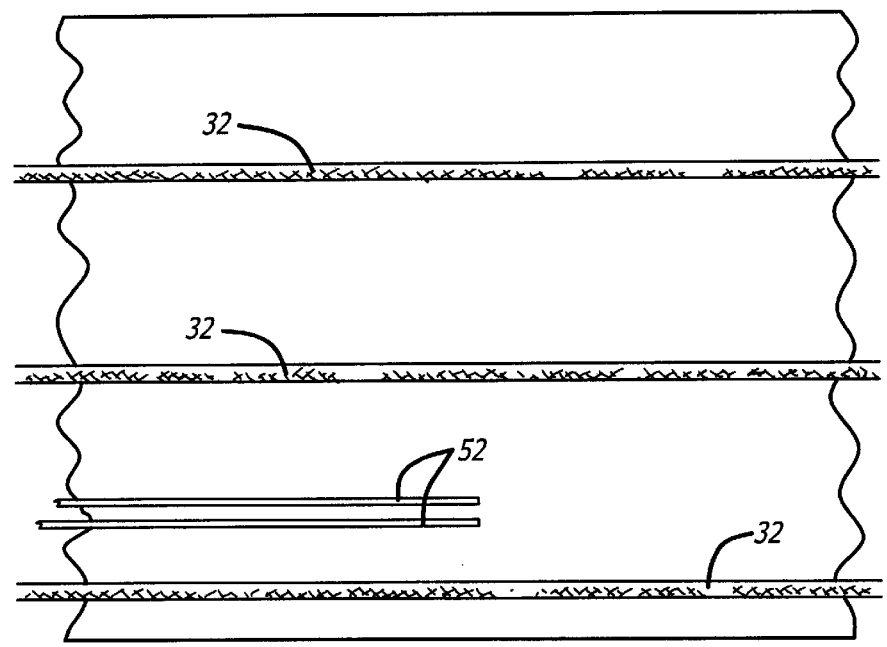

While the preceding figures illustrate a harness 24 in which individual (non-cabled) optical fibers are woven into the interior surface of the fabric 26, other advantageous configurations are possible. FIGS. 4(a) and 4(b) illustrate the exterior and interior surfaces, respectively, of a harness in accordance with an alternative embodiment of the invention. As shown, the individual fibers 52 of the harness are woven into the outer surface of the fabric 55, passing therethrough only at points in approximate registration with the underlying sensor configuration. This further clarifies and simplifies the assembler's task as the appropriate bare fiber(s) for splicing to the underlying sensors and modules is immediately identified without reference to additional wiring diagrams, especially when colored thread or stamped transverse striping is used as a guide for assembly.

Thus it is seen that the present invention provides a telemetry harness for a hydrophone array that greatly simplifies the tasks of assembly and reassembly. By employing a harness in accordance with the invention one may realize significant cost savings in the assembly, troubleshooting and repair processes.

While the present invention has been described with reference to its presently-preferred embodiment, its scope is not limited thereto. Rather, this invention is limited only insofar as it is described by the following set of patent claims and includes within its scope all equivalents thereof.

What is claimed is:

1. A telemetry harness comprising, in combination:
   a) an elongated flexible member of woven fabric having a longitudinal dimension;
   b) a plurality of optical fibers, each of said fibers being captured by at least one element of said elongated flexible member of woven fabric so that said fibers are separate from the weave of said fabric whereby stress within said elongated flexible member of woven fabric is not transmitted to said conductors;
   c) said optical fibers being arranged generally longitudinally with respect to said elongated flexible member of woven fabric;
   d) said fabric is generally rectangular; and
   e) mating strips of adhering material fixed to opposed major edges of said generally-rectangular woven fabric for holding said fabric in a closed configuration having opposed inner and outer fabric surfaces.

2. A telemetry harness as defined in claim 1 wherein said adhering material comprises a hook and loop fastener.

3. A telemetry harness as defined in claim 1 wherein said fabric is NYLON.

4. A telemetry harness as defined in claim 1 wherein said optical fibers are attached to said elongated flexible member of woven fabric in generally-sinusoidal shapes with respect to said longitudinal dimension.

5. A telemetry harness as defined in claim 1 wherein at least one of said optical fibers traverses between said outer and inner surfaces of said woven fabric through an aperture positioned at a predetermined location within said fabric.

6. A telemetry harness as defined in claim 1 wherein opposed ends of said optical fibers are attached to said inner fabric surface.

7. A telemetry harness as defined in claim 1 further including at least one cable attached and arranged generally longitudinally with respect to said elongated member of woven fabric.

8. A telemetry harness as defined in claim 7 wherein said at least one cable is attached to an outer surface of said elongated member of woven fabric.

9. A telemetry harness as defined in claim 8 wherein said at least one cable carries at least one electrical conductor.

10. A telemetry harness as defined in claim 8 wherein said at least one cable carries a plurality of optical fibers.

11. A telemetry harness as defined in claim 1 further including at least one elongated strength member attached and arranged longitudinally with respect to said elongated member of woven fabric.

12. A telemetry harness as defined in claim 11 wherein said at least one strength member is attached to the outer surface of said fabric.

13. A telemetry harness as defined in claim 11 wherein said at least one strength member comprises steel rope.

14. A telemetry harness as defined in claim 11 wherein said at least one strength member comprises a rope of a plurality of braided fibers of a synthetic polymer.

15. A telemetry harness as defined in claim 11 wherein said at least one strength member comprises a rope of a plurality of braided fibers of an aramid.

16. A sensor array comprising, in combination:
   a) a plurality of generally-cylindrical segments arranged end-to-end, each of said segments including a centrally-positioned sensor;
   b) each of said sensors being surrounded by a generally-cylindrical inner layer of foam;
   c) each of said inner layers of foam being surrounded by a telemetry harness;
   d) each of said telemetry harnesses being surrounded by an outer layer of foam;
   e) a continuous hose surrounding the outer layers of foam of said generally-cylindrical segments; and
   f) each of said telemetry harnesses comprising a generally-rectangular woven fabric matrix;
   g) at least one conductor captured by at least one component element of said woven fabric matrix so that at least one end of said conductor terminates at an edge of said matrix.

17. A sensor array as defined in claim 15 wherein at least one of said telemetry harnesses further includes:
   a) at least one strength member; and
   b) said strength member extends from said edge of said generally-rectangular woven fabric matrix to the opposite edge of said generally-rectangular woven fabric matrix.

18. A sensor array as defined in claim 16 wherein said conductor of at least one segment of said array is a bare optical fiber.

19. A sensor array as defined in claim 16 wherein said conductor of at least one segment of said array further comprises:
   a) at least one optical fiber;
   b) said at least one optical fiber being within an elongated cable; and
   c) said at least one cabled optical fiber terminating at said edge of said generally-rectangular woven fabric matrix and at the opposite edge of said generally-rectangular woven fabric matrix.

20. A sensor array as defined in claim 16 wherein said conductor of at least one segment of said array further comprises an elongated electrical conductor.

* * * * *